Patented June 2, 1936

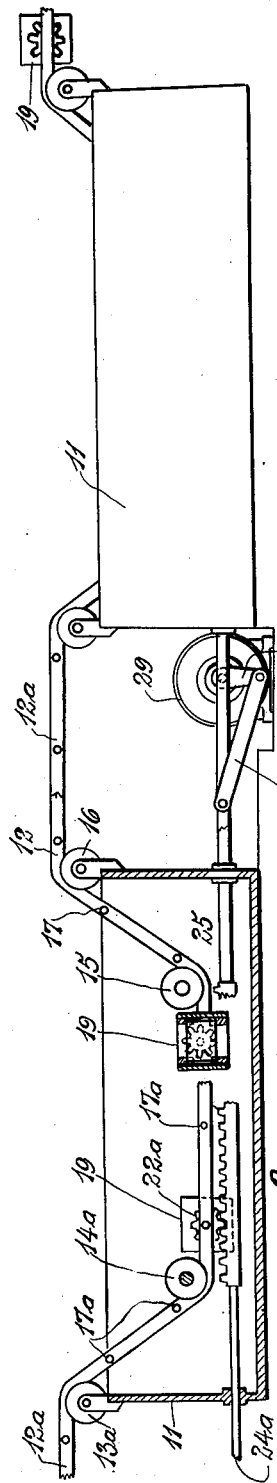
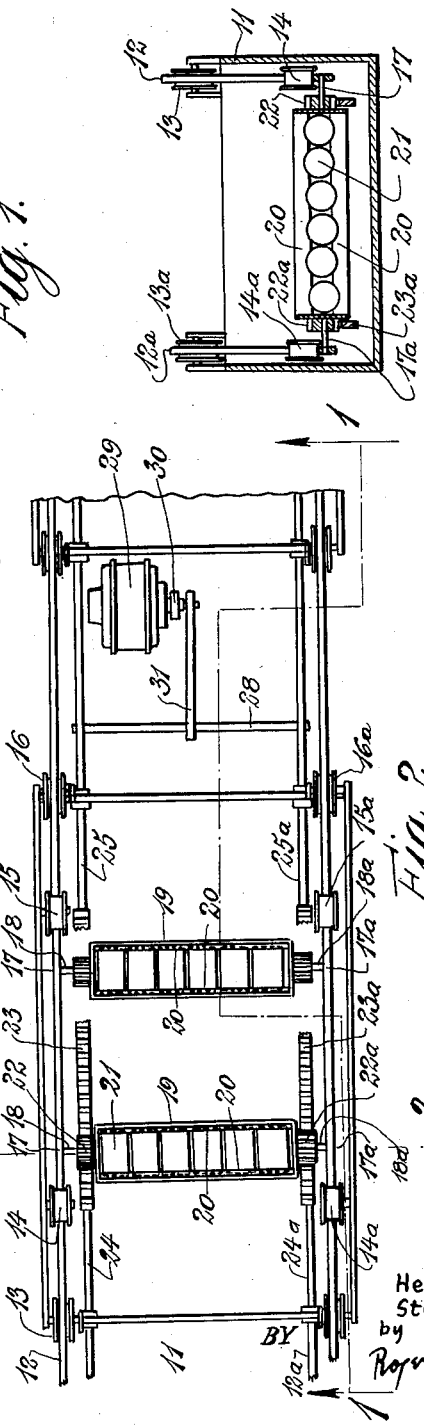

2,042,686

UNITED STATES PATENT OFFICE 2,042,686

METHOD FOR PASTEURIZING AND COOLING

Henry C. Stephens, Balboa, and Stedman B. Hoar, Orange, Calif., assignors, by mesne assignments, to Natural Food Products Company, a corporation of Delaware Original application June 13, 1932, Serial No. 616,952. Divided and this application November 9, 1934, Serial No. 752,292

7 Claims. (Cl. 53—20)

This application is a division of our copending application, Serial No. 616,952, filed June 13, 1932.

Our invention relates to a method of pasteurizing and cooling already-canned food products, and particularly deaerated liquid food products. Such products, in spite of the fact that the absence of oxygen prevents to a considerable extent the danger of cooking during pasteurization, are nevertheless in danger of skin-burning, unless thoroughly agitated and pasteurized with great rapidity.

We are aware of the fact that in the past canned goods have been pasteurized in machines which turned the cans over and over, end for end. But we have found that such end-for-end motion does not sufficiently agitate the contents of cans fully packed with deaerated liquid food products, but rather depends for its efficacy upon the presence of a free space within the can. And even with this free space, the sloshing action, due thereto, is not very efficient. Furthermore, if this free space is air, the pasteurizing produces an undesirable cooking effect. Accordingly we have devised our process and apparatus for angularly reciprocating such cans, end over end.

We are aware of the fact that in the past it has been proposed to rotate cans several times, end over end, and then reverse the rotation. But we have found that even this does not agitate the contents sufficiently to prevent skin-burning, at the high temperatures necessary to rapid pasteurization.

This end can be most satisfactorily attained by rapid angular reciprocation, end for end, through an angle of about 180°.

And we have found further that, even in the case of partly filled cans, our method produces more thorough and more rapid pasteurization than the conventional method.

Accordingly it is the principal object of the present invention to provide for rapid angular reciprocation, end for end, through an angle of about 180°, during pasteurization, of cylindrical cans containing an air-free product.

A further object is to make the pasteurizing and cooling a continuous process, by means of a conveyor-system.

In addition to our principal object, we have worked out a number of novel and useful details, which will be readily evident as the description progresses.

Our invention consists in the novel process combination, which is defined in the appended claims, one apparatus for performing which is exemplified in the accompanying drawing, which is hereinafter particularly described and explained.

Throughout the description, the same reference number is applied to the same member or to similar members.

Figure 1 is a side-elevation, partly in section (along the line 1—1 of Figure 2), of one form of apparatus capable of performing our process.

Figure 2 is a plan view of said apparatus.

Figure 3 is a vertical cross-section of said apparatus along the line 3—3 of Figure 2.

Referring to the drawing, it will be seen that 11 is a tank containing water maintained at proper pasteurizing temperature, by any convenient means (not shown), such as circulation or direct application of burners.

A belt or chain 12, traveling from left to right in Figures 1 and 2, is led over sheave 13 on the end of the tank, under sheaves 14 and 15 within the tank, over sheave 16 on the other end of the tank, and thence to the cooler 32 (to be hereinafter referred to).

On the near side of the tank are the symmetrically arranged belt or chain 12a, and sheaves 13a, 14a, 15a, and 16a.

At regular intervals along belt or chain 12, there is carried a bearing 17, and corresponding bearing 17a on belt or chain 12a. These bearings receive the shafts 18, 18a, each pair of which supports a basket 19.

To simplify the drawing, only three of these baskets are shown. Each basket is preferably made of wire-mesh, and preferably has both its top and its bottom open, so as to allow free circulation of the hot water.

Any convenient means, such as the racks 20, may be employed to support and secure the cans 21 in the baskets.

On each end of each basket 19, is a pinion 22, 22a. These pinions respectively engage two racks 23, 23a. At each end of each rack there is a shaft 24, 24a, 25, 25a, slidable in bearings 26, 26a, 27, 27a, in the ends of the tank. Also it would obviously be possible to mount these racks in bearings within the tank, and to operate them by means which reach over the edges of the tank.

Shafts 25 and 25a are joined by a cross piece 28, through which a motor 29 reciprocates the shafts, by means of crank 30 and pitman 31.

The cooler 32 has the same internal arrangement as the pasteurizer 11 already described, except that the cooler contains cool water or brine, maintained cool by any convenient means well-known in the art.

The motor 29, crank 30, pitman 31, racks 23, 23a, and pinions 22, 22a, are so proportioned and disposed that each revolution of the crank imparts a rotary oscillation of about 180° to each of the baskets of filled tin cans; so that the principal axis of each can is angularly reciprocated through that angle. When we refer to principal axis, here and in the claims, we mean the axis which connects the center of the top of the container with the center of the bottom of the container; top and bottom meaning two substantially flat opposed ends.

The rate of progress of the belts 12, 12a is such as to maintain the cans in the heating water and in the cooling water just long enough for efficient pasteurizing and cooling respectively.

In our process, the cans are first filled with deaerated liquid (the deaeration and filling being accomplished in any convenient manner, known to the art). They are then capped and sealed in such a way as to entrap no surface air. They are then placed and secured in baskets en route to tank 11. When they reach the lower level of the tank, the pinions 22, 22a engage the racks 23, 23a and angular reciprocation of the principal axes of the cans begins, and continues until the cans rise again thoroughly pasteurized.

In practice the length of the course of the baskets during reciprocation is longer, in proportion to the length of course in entering and leaving the tank, than is shown (for convenience in illustration) in the accompanying figures.

Cooling takes place in a similar manner in tank 32.

The cams are then unlocked from their baskets, and are sent to storage, the baskets then returning on return reaches (not shown) of the belts 12, 12a.

The continuous belts are not an essential feature of our invention. Instead the baskets could well be lowered by hand, the shafts sliding in guides in the sides of the tanks, until the pinions 22, 22a engage the racks 23, 23a.

Having now described and illustrated one form of our invention, we wish it to be understood that our invention is not to be limited to the specific form or arrangement of parts hereinbefore described, except in so far as such limitations are specified in the appended claims.

We claim:

1. The process of pasteurizing and cooling packed liquid food products, consisting in: deaerating the food product; packing it in a container without entrapping any air; angularly reciprocating the principal axis of the container rapidly in a hot medium; and angularly reciprocating the principal axis of the container rapidly in a cooling medium.

2. The process of pasteurizing packed liquid food products, consisting in: deaerating the food product; packing it in a container without entrapping any air; and angularly reciprocating the principal axis of the container rapidly in a heating medium.

3. The method of pasteurizing the contents of a cylindrical can containing liquid, which consists in rapidly angularly reciprocating the principal axis of the can, in a hot medium, through an angle of about 180°.

4. The method of pasteurizing and cooling the contents of a cylindrical can containing liquid, which consists in first rapidly angularly reciprocating the principal axis of the can in a hot medium, through an angle of about 180°, then quickly transferring the can to a cold medium, and then rapidly angularly reciprocating the principal axis of the can therein, through an angle of about 180°.

5. The method of pasteurizing the contents of a cylindrical can containing liquid, which consists in rapidly angularly reciprocating the principal axis of the can, in a hot medium, through less than a complete revolution.

6. The method of pasteurizing and cooling the contents of a cylindrical can containing liquid, which consists in first rapidly angularly reciprocating the principal axis of the can in a hot medium, through less than a complete revolution, then quickly transferring the can to a cold medium, and then rapidly angularly reciprocating the principal axis of the can therein, through less than a complete revolution.

7. The process of pasteurizing and cooling packed liquid food products, consisting in: deaerating the food product; packing it in a container without entrapping any air; rapidly angularly reciprocating the principal axis of the container in hot water through an angle of about 180°; and rapidly angularly reciprocating the principal axis of the container in a cooling medium through an angle of about 180°.

HENRY C. STEPHENS.
STEDMAN B. HOAR.